Jan. 5, 1932. A. A. THOMAS 1,839,935
ELECTRIC THERMOSTAT
Filed Aug. 7, 1928
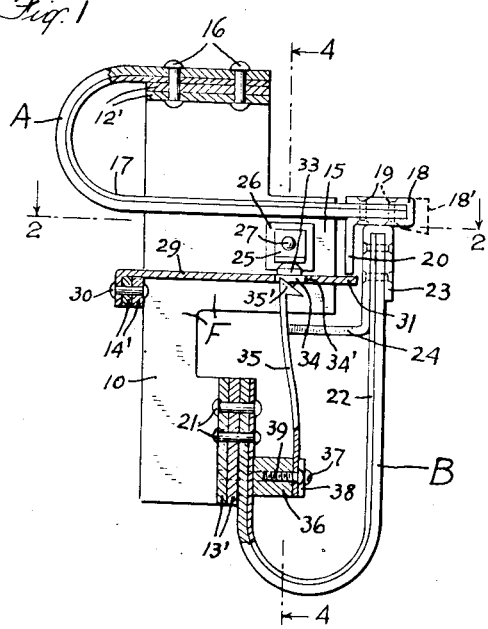
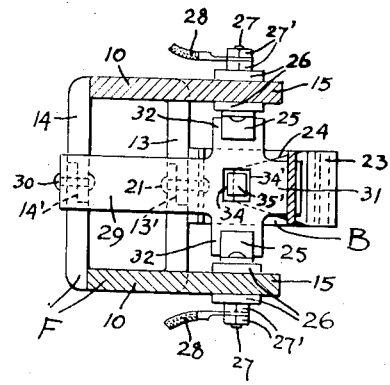
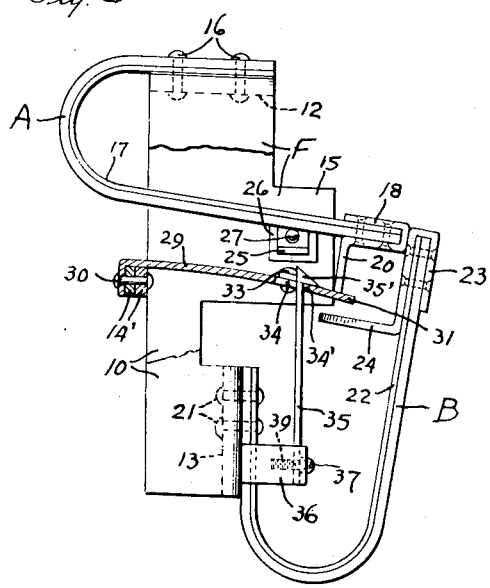
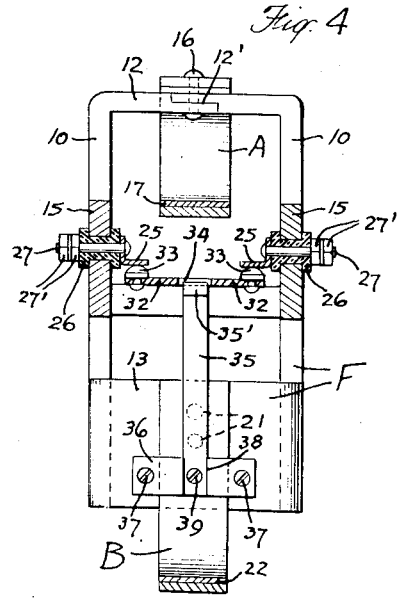
INVENTOR
Adolph A. Thomas Patented Jan. 5, 1932

1,839,935

UNITED STATES PATENT OFFICE

ADOLPH A. THOMAS, OF NEW YORK, N. Y.

ELECTRIC THERMOSTAT

Application filed August 7, 1928. Serial No. 298,066.

My invention is for a thermostat of novel construction, particularly adapted to open and close an electric circuit abruptly without arcing. For this purpose I employ two thermostat bars, one for breaking the circuit at high temperature and the other for closing it at low temperature. These two bars are so arranged that the second or circuit-closing bar normally locks the first or circuit-breaking bar against preliminary thermostatic movement. When a certain high temperature is reached, the second bar passes out of engagement with the first bar, which is thereby suddenly released. The accumulated thermostatic stresses actuate the released bar abruptly against a spring switch member, which is thrown open so quickly that no arcing takes place. A spring catch or equivalent device automatically locks the actuated switch member in open position. The two thermostat bars may be so arranged that, as they begin to cool, the circuit-breaking bar locks the other bar against return movement until the first named bar disengages the second bar at predetermined low temperature. When the second or circuit-closing bar moves to normal position, it actuates the spring catch to release the switch member, which instantly snaps back to normal circuit-closing position.

The thermostat of my invention is characterized by the absence of coil and buckling springs, by simplicity of construction, and certainty of operation. It is especially useful for automatically controlling the temperature of electric heating appliances, like flat irons, toasters, ovens, and so on. The novel features and practical advantages of my new thermostat will be fully understood from a detailed description of the accompanying drawings, which show a preferred embodiment of my invention. In these drawings, which have been purposely exaggerated for clearness, Fig. 1 shows a side view of my thermostat, partly in section, with the parts in normal circuit-closing position;

Fig. 2 is a cross-section on line 2—2 of Fig. 1;

Fig. 3 is like Fig. 1, with the two thermostat bars and switch member in actuated position after the circuit has been opened; and Fig. 4 represents a vertical section on line 4—4 of Fig. 1.

A supporting frame indicated as a whole by F comprises a pair of parallel sides 10, a connecting cross-piece 12 at the top, a cross-piece 13 at the bottom, an intermediate cross-piece 14, and a pair of lateral extensions 15. These parts can be cast or molded as a single piece, or the entire frame can be shaped out of sheet brass, aluminum, and the like. If desired, the U-shaped frame F can be made of two complementary halves connected by bolts or rivets at the overlapping joints 12', 13' and 14'. When I speak of the top and bottom of the frame, I assume it to be in vertical position, as illustrated in the drawings. Obviously, the frame can be supported horizontally.

A U-shaped thermostat bar A of bimetallic construction (usually brass and iron) is secured at one end to cross-piece 12 by bolts or rivets 16, which also serve to connect the overlapping ends of joint 12'. The inner strip 17 of bar A has the higher coefficient of expansion, so that the free end of the bar moves down on increase of temperature. A head 18 is secured to the free end of thermostat bar A by rivets 19, and one end of the head terminates in a lateral extension 20. The head 18 is preferably of hard metal capable of resisting wear, such as steel, bronze, etc., and it can be cast or bent out of sheet metal. The lateral extension or finger 20 can be attached to bar A as a separate pin, but it saves an extra part to make it integral with head 18.

A second U-shaped thermostat bar B of bimetallic construction is secured at one end to the cross-piece 13 by bolts or rivets 21, which pass through the overlapping joint 13' to help fasten the two halves of the supporting frame together. The inner strip 22 of bar B has the higher coefficient of expansion, so that the free end of the bar moves toward the right as the temperature rises. The free end of thermostat bar B carries a head 23 which terminates at one end in a lateral extension 24. The head 23, like the head 18, is preferably of wear-resisting metal, and the extension 24, like the extension 20, may be in the form of a separate pin fastened to thermostat bar B. Although the thermostat bars A and B are shown U-shaped, straight bars can be used, but U-shaped bars have the advantage of greater length in a small space and greater leverage.

The lateral extensions 15 of the supporting frame F carry a pair of insulated contacts 25, which are here shown as L-shaped strips of brass or other good conducting metal. If the frame F is constructed of metal, the contacts 25 are insulated by suitable insulation 26. Bolts or rivets 27 secure the contact pieces 25 to the sides 10 of the frame, and the outer ends of these bolts may serve as binding posts for conductors 28, which are clamped between nuts 27'. The insulated terminal contacts 25 are electrically connected by a spring plate or arm 29 mounted at one end on the cross-piece 14 by one or more bolts or rivets 30, which pass through the overlapping joint 14' of the cross-piece. The free end 31 of switch arm 29, which is preferably punched from spring metal having good conducting properties, extends into the path of the pin or projection 20 on thermostat bar A. As shown in Fig. 2, the switch arm or plate 29 has lateral extensions 32 which carry a pair of contacts 33 normally engaging the stationary contacts 25. The contact buttons 33 are not absolutely necessary, for the spring arm 29 can directly engage the contacts 25 to close the circuit. The arrangement and mounting of the parts are such that normally the spring arm 29 presses the contact buttons 33 against the stationary contacts 25, so that the circuit is closed with a positive pressure action which holds the contacting surfaces firmly together.

At a convenient point between its ends, the switch arm 29 has a slot 34 adapted to cooperate with a spring pawl or catch 35 having a bevelled head 35' for locking the switch arm in open position. The spring catch 35 is mounted in any practical way on the common supporting frame F. In the present instance, I attach a block 36 to the cross-piece 13 by screws or bolts 37. The lower end of the spring catch 35 fits in a recess 38 in block 37, and a screw 39 or the like holds the spring catch in place. Any other practical mounting for the spring catch may be used. The inherent set or tension of spring catch 35 is such that normally its bevelled head 35' is out of alignment with slot 34 if the spring is unrestrained. However, when the parts are in normal position, as shown in Fig. 1, the extension 24 on thermostat bar B forces the spring catch 35 substantially into line with slot 34.

Referring to Figs. 1 and 4, which show the movable parts of the instrument in normal position, it will be seen that the spring arm or plate 29 is in pressure engagement with the contacts 25 to close the circuit, the free end of thermostat bar B is beneath the free end of thermostat bar A to prevent downward movement of the latter, and the pin or projection 24 on bar B holds the bevelled head 35' of the spring catch in line with slot 34 of switch arm 29. The head 18 of bar A is shown in contact with head 23 of bar B, but at normal temperature the two heads may be slightly spaced, so that the bar A has a small preliminary movement (insufficient to actuate the switch arm 29) before encountering the head 23. As the temperature rises, the free end of thermostat bar A wants to move down, but is prevented by the locking engagement of thermostat bar B. The latter, however, is free to move toward the right on continued increase of temperature. While there will be some resistance to this movement of bar B by the downwardly pressing end of bar A, this resistance is duly overcome as the heat increases until the head of bar B passes out of engagement with the head of bar A. The moment this happens, the accumulated thermostatic stresses in bar A move it quickly downward, causing the extension 20 to strike the free end 31 of the spring arm 29. The sudden downward blow thus imparted to the switch arm breaks the circuit abruptly at two points in series, so that no arcing takes place. When the thermostat bar B begins to move toward the right, the projection 24 allows the spring catch 35 to move into normal position, so that the tip of head 35' is out of line with the edge 34' of slot 34. Consequently, when the extension 20 of the released thermostat bar A strikes the switch arm 29 a downward blow to break the circuit, the bevelled head 35' of spring catch 35 snaps into the slot 34 and locks the switch arm against return movement. This will be clearly understood from Fig. 3.

As the temperature falls after interruption of the circuit, the thermostat bars begin to return to normal position—that is to say, the free end of bar A moves up and the free end of bar B moves to the left. The two thermostat bars may be so constructed and proportioned that they return to normal position about the same time, but the bars may be so mounted that the head of bar B engages the head of bar A before the latter has reached normal position. Referring to Fig. 3, it is clear that the bar B is locked against return movement until the head of bar A has moved upward out of engagement with the head of bar B. When that happens, the released thermostat bar B moves quickly to normal position and the lateral extension 24 pushes back the spring catch 35 until the bevelled head 35' is in line with the slightly larger slot 34 of switch arm 29. The latter is thus released and instantly snaps back to normal position against the contacts 25, so that the circuit is abruptly closed with a pressure contact. The temperature of the thermostat bars now increases and the cycle of operations above described is automatically repeated, so that the temperature of the electric heating appliance containing the thermostat is automatically maintained within prescribed limits. The lateral projection 20 on bar A or the free end of switch arm 29 may be arranged to touch the head 23 of the bar B when the parts are in normal position, so as to form a positive stop for bar B when the latter returns to normal position on cooling. This will be clear from Fig. 1 without additional illustration.

Attention is called to the fact that the circuit remains closed with a firm pressure contact until the released bar A flies against the switch arm 29, and the circuit is not closed until both thermostat bars have returned to substantially normal position, whereupon the switch arm 29 snaps against the contacts 25. It is perhaps desirable that bar A in the normal position is slightly spaced from the head 23 of bar B, as previously mentioned, so that bar B is always sure to return to normal position without possible interference by the head 18 of bar A. There is no danger of the instrument being put out of operation by interference of the thermostat bars with each other. Absolutely correct timing of the thermostatic movements of the bars is not necessary, because the bar B cannot return to normal position to close the circuit prematurely until the bar A has reached normal position. If the head of bar B should strike the head of bar A before the latter has reached normal position, the two bars do not become permanently locked together, for the bar A on cooling continues to rise at the free end until the head 18 passes out of engagement with the head 23 of bar B. When that happens, the bar B moves quickly to normal position and abruptly closes the circuit by releasing the spring switch arm 29, as previously described. The locking of bar B by bar A until a certain low temperature is reached may be desirable or necessary in some embodiments of my invention, but it is not necessary when the spring catch 35 is used. That is so, because the spring arm 29 closes the circuit with a snap action even when the catch 35 is pushed back slowly by the returning bar B. The relative positions of the thermostat bars as illustrated in Fig. 3 are intended to be merely approximate. At the moment when the circuit is opened, the head 23 of bar B has probably moved out of contact with the head 18 of bar A, but I have not attempted to show the exact positions, which could only be observed through the medium of slow motion pictures and perhaps the stroboscope.

It is noteworthy that this new instrument is free from the objections and disadvantages inherent in prior thermostats using coil springs or buckling springs, which are liable to lose their elasticity at high temperature and so cease to function. While the parts 29 and 35 are in the form of spring blades, they can be made of spring metal which will perform its intended operation at a temperature above the highest degree used in electric heating appliances for the home. It is possible to regulate the circuit-breaking temperature by varying the length of head 18 on thermostat bar A. For example, it is clear from Fig. 1 that, if the head 18 were extended to the right as indicated by the outline 18', the head 23 of thermostat bar B would have to move through a wider angle before releasing the thermostat bar A, and that simply means that the circuit would be broken at a correspondingly higher temperature.

Although I have shown and described a certain specific construction, I want it understood that my invention is not limited to the details set forth. The basic principle of my new thermostat may be mechanically embodied in other ways without departing from the scope of the invention as defined in the following claims.

I claim as my invention:

1. An electric thermostat comprising a pair of interlocking thermostat bars mounted to move in the same plane, and a switch member abruptly opened and closed by the thermostatic movements of said bars.

2. A thermostat comprising a pair of thermostat bars arranged to interlock in such a way that one bar holds the other against movement until a certain high temperature is reached and the other bar holds the first named bar against return movement until a certain low temperature is reached, a normally closed switch member arranged to be opened abruptly by one of said bars at the high temperature limit, means for holding said switch member in open position, and means operated by the other bar for causing said switch member to close abruptly at the low temperature limit.

3. In an electric thermostat, the combination of a normally closed switch member, a thermostat bar for opening said switch member at certain high temperature, a second thermostat bar for closing said switch member at certain low temperature, and means whereby said circuit opening and closing operations take place abruptly to prevent arcing.

4. The combination of an electric switch, a thermostatic element for abruptly opening said switch at certain high temperature, a second thermostatic element for abruptly closing said switch at certain low temperature, and means whereby the second element normally locks the first element against movement until said high temperature is reached.

5. A thermostat comprising a pair of thermostat bars arranged to interlock in such a way that one bar holds the other against movement until a certain high temperature is reached and the other bar holds the first named bar against return movement until a certain low temperature is reached, a movable switch member controlled by said bars for quick operation from either position to the other, and a support on which said thermostat bars and switch member are mounted to move in the same plane.

6. An electric thermostat comprising a thermostat bar, a second thermostat bar normally locking the first bar against movement until a certain high temperature is reached, a switch arranged to be abruptly opened by the movement of said first bar, said switch remaining in open position, and means whereby the second bar on cooling causes abrupt closing of the switch.

7. The combination of a movable switch member normally in closed position, a thermostat bar for abruptly actuating said switch member to open position at predetermined high temperature, said switch member remaining open, and a second thermostat bar for abruptly closing said switch member at low temperature, the second bar locking the first named bar against movement until said high temperature is reached.

8. An electric switch comprising a movable switch member normally in circuit-closing position, thermostatic means for moving said member to open the circuit at predetermined high temperature, means for holding said member in open position, and separate thermostatic means for operating said holding means to release the switch member for return to circuit-closing position at predetermined low temperature.

9. A thermostat comprising a pair of thermostat bars arranged to interlock in such a way that one bar holds the other against movement until a certain high temperature is reached and the other bar holds the first named bar against return movement until a certain low temperature is reached, and a switch member operated by the movements of said bars to open and close an electric circuit with a snap action.

10. An electric thermostat comprising a pair of thermostat bars mounted to move in the same plane and so arranged that one bar normally locks the other until a certain high temperature is reached, whereupon the locked bar is released and moves abruptly, a normally closed switch arranged to be opened by the released bar, and means controlled by the other bar for suddenly closing said switch at predetermined low temperature.

11. An electric thermostat comprising a pair of thermostat bars mounted at right angles to each other, said bars being so arranged that normally one of them locks the other until a predetermined high temperature is reached, a normally closed switch member mounted independently of said bars and arranged to be actuated by the released bar to open the circuit abruptly, and means to prevent closing of said switch member until the other bar on cooling reaches a certain position.

12. An electric thermostat comprising a pair of thermostat bars mounted at right angles to each other and movable in the same plane, said bars being so arranged that normally one of them locks the other until a predetermined high temperature is reached, a normally closed switch member arranged to be actuated by the released bar to open the circuit abruptly, and means controlled by the other bar to prevent closing of said switch member until a certain low temperature is reached.

13. An electric thermostat comprising a support, a pair of substantially U-shaped thermostat bars mounted on said support at right angles to each other and movable in the same plane, said bars being so arranged that normally one of them locks the other until a predetermined high temperature is reached, a normally closed switch member arranged to be actuated by the released bar to open the circuit abruptly, and means to prevent closing of said switch member until the other bar on cooling reaches a certain position.

14. In an electric thermostat, the combination of a thermostat bar, a second thermostat bar normally locking said first bar against movement until a predetermined high temperature is reached, whereupon the first-named bar is released for quick movement, a spring switch member normally closing an electric circuit and arranged to be actuated by the released bar to open the circuit abruptly, means for automatically locking said switch member in open position, and means whereby the second bar on cooling releases said locking means and causes said switch member to snap back to normal position.

15. In an electric thermostat, the combination of a thermostat bar, a second thermostat bar normally locking said first bar against movement until a predetermined high temperature is reached, whereupon the first named bar is released for quick movement, a spring switch member normally closing an electric circuit and arranged to be actuated by the released bar to open the circuit abruptly, a spring catch for automatically locking said switch member in open position, and means whereby the second bar on cooling releases said spring catch and causes said switch member to snap back to normal position.

16. An electric thermostat comprising a frame, a pair of insulated contacts on said frame, a spring arm mounted on said frame and normally engaging said contacts to connect the same electrically, thermostatic means for abruptly moving said arm away from said contacts at predetermined high temperature to break the circuit at two points in series, a movable member adapted to lock the actuated arm against return movement, and separate thermostatic means to operate said locking member at predetermined low temperature and thereby cause said spring arm to snap back into engagement with said contacts.

17. In an electric thermostat, the combination of a thermostat bar, a second thermostat bar normally locking said first bar against movement until a predetermined high temperature is reached, whereupon the first named bar is suddenly released for quick movement, a spring switch member normally closing an electric circuit and arranged to be actuated by the released bar to open the circuit abruptly, a spring catch for automatically locking said switch member in open position, means whereby the second bar on cooling releases said spring catch and causes said switch member to snap back to normal position, and a common supporting frame on which all of said parts are mounted for movement in the same plane.

18. In an electric thermostat, the combination of a thermostat bar, a second thermostat bar normally locking said first bar against movement until a predetermined high temperature is reached, whereupon the first named bar is suddenly released for quick movement, a spring switch member normally closing an electric circuit, a projection mounted on the free end of the first bar for engaging said switch member when said bar is released and abruptly moving it to break the circuit, a spring catch for automatically locking said switch in open position, and a projection on the free end of the second bar for engaging said catch when the bar returns to normal position and thereby releasing said switch member to close the circuit abruptly.

19. An electric thermostat comprising a frame, a pair of insulated contacts on said frame, a spring arm mounted on said frame and normally engaging said contacts to connect the same electrically, a thermostat bar mounted on said frame for abruptly moving said arm away from said contacts at predetermined high temperature to break the circuit at two points in series, a spring catch supported on said frame and adapted to lock said switch arm in open position, and a second thermostat bar mounted on said frame for actuating said catch at predetermined low temperature to release said arm for return to normal position.

20. An electric thermostat comprising a frame, a pair of insulated contacts on said frame, a spring arm mounted on said frame and normally engaging said contacts to connect the same electrically, a thermostat bar mounted on said frame for abruptly moving said arm away from said contacts at predetermined high temperature to break the circuit at two points in series, a spring catch supported on said frame and adapted to lock said switch arm in open position, and a second thermostat bar mounted on said frame for actuating said clutch at predetermined low temperature to release said arm for return to normal position, and means whereby the second thermostat bar locks the other bar against movement until said high temperature is reached.

ADOLPH A. THOMAS.